United States Patent

Yoshii et al.

[11] Patent Number: 5,198,205
[45] Date of Patent: Mar. 30, 1993

[54] CARBON BLACK FOR TIRE TREAD RUBBER

[75] Inventors: Yasuharu Yoshii; Shinji Misono; Hitoshi Ue, all of Gotenba, Japan

[73] Assignee: Tokai Carbon Co., Ltd., Tokyo, Japan

[21] Appl. No.: 759,378

[22] Filed: Sep. 13, 1991

Related U.S. Application Data

[63] Continuation of Ser. No. 373,973, Jun. 30, 1989, abandoned.

[30] Foreign Application Priority Data

Jul. 21, 1988 [JP] Japan .................. 63-182378

[51] Int. Cl.$^5$ .................. C09C 1/48
[52] U.S. Cl. .................. 423/445
[58] Field of Search .................. 423/445

[56] References Cited

U.S. PATENT DOCUMENTS

| | | | |
|---|---|---|---|
| 3,615,211 | 10/1971 | Lewis | 422/151 |
| 4,250,145 | 2/1981 | Pobst, Jr. et al. | 423/450 |
| 4,289,743 | 9/1981 | Ruble | 423/450 |
| 4,316,881 | 2/1982 | Pobst et al. | 423/450 |
| 4,478,973 | 10/1984 | Misono et al. | 524/496 |
| 4,500,672 | 2/1985 | Suzuki et al. | 423/450 |
| 4,569,834 | 2/1986 | West et al. | 423/460 |
| 4,784,695 | 11/1988 | Mito et al. | 423/450 |
| 4,786,677 | 11/1988 | Nakai et al. | 524/496 |
| 4,808,395 | 2/1989 | Yoshimura et al. | 423/456 |
| 4,933,107 | 6/1990 | Watanabe | 524/495 |
| 5,069,892 | 12/1991 | Nakai | 423/445 |

Primary Examiner—Michael Lewis
Assistant Examiner—Stuart L. Hendrickson
Attorney, Agent, or Firm—Armstrong, Westerman, Hattori, McLeland & Naughton

[57] ABSTRACT

There is disclosed carbon black for a tire tread rubber which has a nitrogen adsorption specific surface area ($N_2SA$) of 60 to 160 m$^2$/g and a dibutyl phthalate absorption (DBP) of 90 to 150 ml/100 g which belong to the respective regions of hard grades of carbon black, and an intraaggregate void volume Vp (ml/g) at least equal to the value calculated according to the equation: [0.00976×DBP−0.0358].

1 Claim, 1 Drawing Sheet

CARBON BLACK FOR TIRE TREAD RUBBER

This is a continuation of Application No. 373,973, filed Jun. 30, 1989, now abandoned.

BACKGROUND OF THE INVENTION

The present invention relates to carbon black for a tire tread rubber, and more particularly to carbon black which can impart a high abrasion resistance to a tire tread rubber while keeping the heat build-up in the tire tread rubber on a conventional level.

The effect of reinforcing a rubber by carbon black has heretofore been considered to be largely governed by the specific surface area (particle size) and structure of carbon black. Accordingly, there are known many grades of carbon black differing in these properties.

In compounding carbon black into a rubber component, an appropriate choice is made of the grade of carbon black having characteristics adapted to the application of a rubber composition to be prepared. For example, a hard grade of carbon black, such as N110 or N220, is used in a rubber member requiring a high abrasion resistance, such as a tire tread portion subject to severe running conditions. As the running conditions for tires have recently become more and more severe, however, such a high performance has been required of a tire tread portion so as to satisfy particularly a high abrasion resistance and a low heat build-up at the same time.

In general, it is known that the abrasion resistance of a tire tread portion is enhanced as the specific surface area and structure of carbon black compounded thereinto are increased. However, it also is known that the heat build-up in the tire tread portion is increased in keeping with increases in the specific surface area and structure of carbon black. Thus, the abrasion resistance has an antinomic relation with the heat build-up. Accordingly, it has been considered extremely difficult to simultaneously impart a high abrasion resistance and a low heat build-up to a rubber composition.

With a view to solving such a difficulty, there was proposed an attempt to impart a high abrasion resistance and a low heat build-up to a tire tread by using furnace carbon black having a nitrogen adsorption specific surface area ($N_2SA$) of 94 to 145 $m^2/g$, a dibutyl phthalate absorption of 89 to 107 ml/100 g, and a true specific gravity lower than the value calculated according to the equation: $\{(-0.0006 \times N_2SA\ (m^2/g) + 1.8379\}$ (see Japanese Patent Publication No. 34,149/1978). There also was proposed an attempt to simultaneously impart a high abrasion resistance and a low heat build-up to a tire tread by using carbon black satisfying the following three conditions: $N_2SA = 100 \sim 200\ m^2/g$ $T = \Delta Dst^{50} \times \Delta Dst^{75} \cdot R$, and $4,100 - 18.1\ (N_2SA) < T < 7,700 - 25.5\ (N_2SA)$, wherein $\Delta Dst$ is a difference between two equivalent Stokes diameters and R is the maximum absorbance at a Stokes mode diameter, to improve a workability in dispersing it into a rubber (see Japanese Patent Laid-Open No. 112,638/1988). Despite such proposals, however, no rubber compositions containing, compounded thereinto, carbon black having such specified properties can simultaneously secure the satisfactory levels of abrasion resistance and heat build-up, in which further improvements has therefore been demanded.

In view of the above, the inventors of the present invention have made investigations on not only the $N_2SA$ and dibutyl phthalate absorption of carbon black but also the intraaggregate void volume thereof, and have found that, when carbon black in the form of aggregates having a certain level of structure and a large intraaggregate void volume is compounded into a rubber component, the resulting rubber composition has a high abrasion resistance and a low heat build-up. The present invention has been completed based on this finding.

SUMMARY OF THE INVENTION

A first object of the present invention is to provide carbon black which can impart a high abrasion resistance to a tire tread rubber while keeping the heat build-up in the tire tread rubber on a conventional level.

A second object of the present invention is to provide carbon black which can be suitably used in a tread rubber of large tires for trucks, buses, etc. to be put into service under severe running conditions.

DETAILED DESCRIPTION OF THE PREFERRED EMBODIMENT

Figure 1:
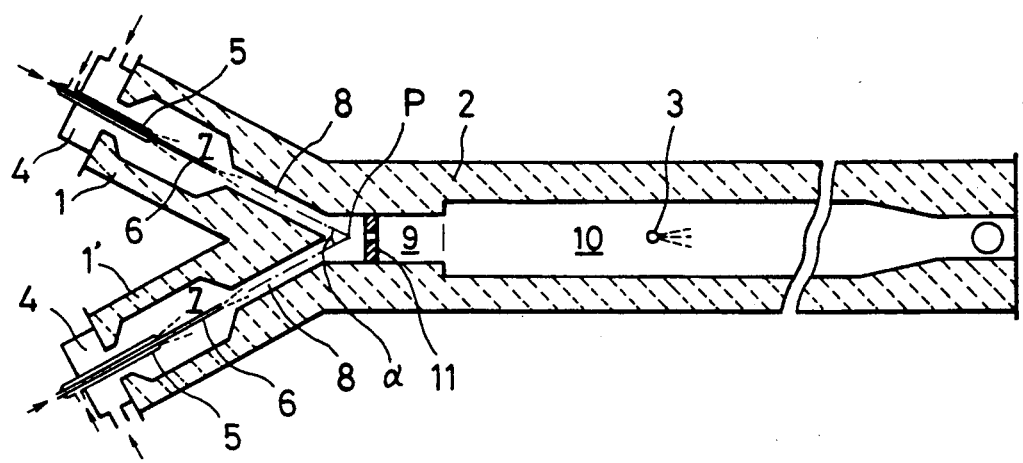
FIG. 1 is a schematic cross-sectional view of an example of a reactor to be used in the production of the carbon black of the present invention.

The carbon black for a tire tread rubber according to the present invention has a nitrogen adsorption specific surface area ($N_2SA$) of 60 to 160 $m^2/g$ and a dibutyl phthalate absorption (DBP) of 90 to 150 ml/100 g which belong to the respective regions of hard grades of carbon black, and an intraaggregate void volume Vp (ml/g) at least equal to the value calculated according to the equation: $(0.00976 \times DBP - 0.0358)$. Among the above-mentioned characteristic properties, the nitrogen adsorption specific surface area ($N_2SA$) of 60 to 160 $m^2/g$ and the dibutyl phthalate absorption of 90 to 150 ml/100 g, which are a particle-related range and a structure-related range, respectively, belonging to the respective regions of hard grades of carbon black, are prerequisites for the carbon black to impart a high abrasion resistance to a compounding rubber. When the nitrogen adsorption specific surface area ($N_2SA$) is smaller than 60 $m^2/g$, or when the dibutyl phthalate absorption is lower than 90 ml/100 g, carbon black cannot impart a high abrasion resistance to a tire tread. When the nitrogen adsorption specific surface area ($N_2SA$) exceeds 160 $m^2/g$, the dispersibility of carbon black in a rubber component is reduced to thereby inhibit an improvement in the abrasion resistance thereof and bring about a high heat build-up. When the dibutyl phthalate absorption exceeds 150 ml/100 g, carbon black unfavorably lowers the ice skid performance of a tire tread.

The value calculated according to the equation: $[0.00976 \times DBP - 0.0358]$, which is the lower limit of the intraaggregate void volume Vp (ml/g) of the carbon black of the present invention, assures that the carbon black of the present invention has an aggregate texture peculiar to a highly developed structure which has a high anisotropy as compared with those of conventional grades of carbon black to be compounded into a rubber component. When the intraaggregate void volume Vp (ml/g) is equal to or larger than the value calculated according to the above-mentioned equation, carbon black can impart a superb abrasion resistance to a tire tread while securing a low heat build-up therein comparable to those in tire treads containing, compounded thereinto, a conventional grade of carbon black.

Carbon black having a large intraaggregate void volume Vp essentially has an aggregate texture with a developed structure, which works to enhance the reinforcement of a rubber when the carbon black is compounded into the rubber. The carbon black of the present invention having an intraaggregate void volume Vp at least equal to the value calculated according to the equation: $(0.00976 \times DBP - 0.0358)$ is conspicuously developed in anisotropy. The developed anisotropy serves to remarkably improve the abrasion resistance of a rubber component. The nitrogen adsorption specific surface area ($N_2SA$) of 60 to 160 $m^2/g$ and the dibutyl phthalate absorption of 90 to 150 ml/100 g, which are prerequisites for carbon black to impart a high abrasion resistance to a rubber as described above, may serve synergistically with the above-mentioned intraaggregate void volume Vp to provide a high abrasion resistance to a rubber component while securing a conventional level of heat build-up therein.

The characteristic values of the carbon black of this invention were measured according to the following methods (1) Nitrogen adsorption specific surface area ($N_2SA$): ASTM D 3037-78 "Standard Methods of Testing Carbon Black—Surface Area by Nitrogen Adsorption" Method B. The $N_2SA$ of IRB No. 5 measured according to this method was 80.3 $m^2/g$ (IRB stands for Industry Reference Black.)

(2) Dibutyl phthalate absorption (DBP): JIS K6221 (1975) "Method of Testing Carbon Black for Rubber", Section 6.1.2, Method A (corresponding to ASTM D2414-82)

A prescribed quantity of dry carbon black is placed in the mixing chamber of an adsorptometer. Dibutyl phthalate is added dropwise to the carbon black from a buret with mixing. The buret is closed automatically by the action of a limit switch when the torque of the rotor in the mixing chamber reaches a predetermined value. The absorption is calculated from the following equation.

$$DBP = \frac{V}{W_D} \times 100$$

wherein DBP: absorption of dibutyl phthalate (ml/100 g)
V: volume of dibutyl phthalate added (ml)
$W_D$: quantity of dry carbon black (g)

(3) Intraaggregate void volume Vp (ml/g)

Using a mercury porosimeter Poresizer 9300 manufactured by Micromeritics, a carbon black sample is immersed in mercury, to which a slowly increasing pressure is applied to gradually infiltrate the mercury into the micropores of the carbon black in accordance with the pressure. The intraaggregate void volume is calculated from the relationship between the pressure and the amount of mercury infiltrated according to the equation (1).

$$Vp \text{ (ml/g)} = \frac{(X_1 - X_2)}{W} \times CF \quad (1)$$

wherein $X_1$: reading of the mercury porosimeter at 25 psi
$X_2$: reading of the mercury porosimeter at 30,000 psi
W: weight of carbon black sample (g)
CF: constant determined by a cell used in the measurement Additionally stated, the intraaggregate void size corresponding to the applied pressure of 25 psi is 7.2 $\mu m$, while that corresponding to the applied pressure of 30,000 psi is 0.006 $\mu m$.

The carbon black of the present invention is produced using, for example, a Y-shaped oil furnace as shown in FIG. 1 (see Japanese Patent Publication No. 10,581/1987). This oil furnace comprises two generators 1 and 1' and a main reaction zone 2 extending from a position where the two generators converge. Each generator is made up of a wind box 4, a burner 5, a combustion chamber 7 having therein a feedstock oil spray nozzle 6, and a pyrolysis duct 8 integrated with the combustion chamber 7. The hydrocarbon feedstock oil is sprayed into the combustion gas of fuel oil via the feedstock oil spray nozzle 6 so that the oil spray is pyrolyzed to form a gas stream of carbon black intermediate. The two gas streams of carbon black intermediate are simultaneously entrained into the reaction chamber 2 at a high speed to impinge against each other at point P in a space 9. Thereafter, the resulting stream is cooled with water sprayed at the position of a cooling water spray 3 and carbon black is then separated therefrom. The conditions of forming the gas streams of carbon black intermediate in the generators 1 and 1' are controlled to adjust the intraaggregate void volume Vp of the resulting carbon black, while the conditions of burning in the furnace, the residence time in the furnace of the stream of carbon black being produced, etc. are controlled to adjust the nitrogen adsorption specific surface area ($N_2SA$) and dibutyl phthalate absorption thereof. In the foregoing manner, carbon black having the characteristic properties specified in the present invention can be produced.

As described above, the carbon black of the present invention which has a highly anisotropic aggregate texture with a highly developed structure can impart a high abrasion resistance to a compounding rubber while securing a conventional level of heat build-up therein. Accordingly, the carbon black of the present invention can be suitably used in a tread rubber of large tires for trucks, buses, etc. to be put into service under severe running conditions.

According to a customary method, the carbon black of the present invention is compounded into an elastomer, examples of which include a natural rubber, a styrene-butadiene rubber, a polybutadiene rubber, an isoprene rubber, a butyl rubber, and other various synthetic rubbers and mixed rubbers capable of being reinforced with common carbon black.

35 to 100 parts by weight of the carbon black of the present invention is compounded into 100 parts by weight of a rubber component. The carbon black and the rubber component are kneaded together with other necessary components such as a vulcanizing agent, a vulcanization accelerator, an age resister, a vulcanization aid, a softener, and a plasticizer to prepare a rubber composition for tire treads.

Examples of the present invention will now be described in comparison with Comparative Examples.

The methods of measuring various characteristic properties of vulcanized rubber compositions in Examples and Comparative Examples are as follows. (a) Abrasion Loss Abrasion loss was measured with a Lambourne abrasion tester (with mechanical slip mechanism) under the following conditions:

test piece: 10 mm thick, 44 mm in outside diameter
Emery wheel GC type; grain size: #80; hardness: H
carborundum added: grain size: #80, adding rate: approximately 9 g/min
relative slip ratio of Emery wheel surface to test piece: 24%, 60%
speed of revolution of test piece: 535 rpm (b) Hysteresis Loss (tan δ)

Hysteresis loss was measured with a viscoelastic spectrometer (manufactured by Iwamoto Seisakusho Co.) under the following conditions:

test piece: 2 mm thick, 30 mm long, 5 mm wide
temperature: room temperature
frequency: 50 Hz
dynamic strain (amplitude): ±1%

(c) Other Properties

All other measurements were made according to JIS K6301 "Physical Test Method for General Rubbers"

EXAMPLE 1

Proproduction of Carbon Black

Figure 2:
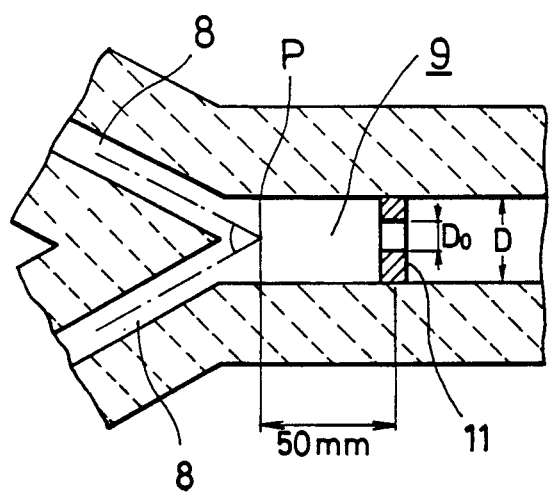
FIG. 2 is an enlarged cross-sectional view of the essential portion of the reactor shown in FIG. 1.

The oil furnace used has a Y-shaped structure as shown in FIG. 1 which comprises two generators 1 and 1' so arranged as to converge at an angle of 60° with each other in front of a main reaction zone 2 having a front narrow portion 9 of 90 mm in inside diameter and 700 mm in length and a rear broad portion 10 of 200 mm in inside diameter and 2,000 mm in length. Each generator comprises a pyrolysis duct 8 (60 mm in inside diameter and 500 mm long) and a combustion chamber 7 (400 mm in inside diameter and 800 mm long, including 200 mm of conical sections) provided with a burner 5 and a feedstock oil spray nozzle 6 arranged coaxially with each other through a wind box 4 provided around a front portion thereof. A ring member 11 having a constriction ratio of 0.65 is provided 50 mm downstream of the intersectional point P in the front narrow portion 9 as shown in FIG. 2. The ring member 11 is made of a fire brick. The constriction ratio m is expressed by the following equation:

$$m = \frac{\pi/4 \, D_0^2}{\pi/4 \, D^2} = \left(\frac{D_0}{D}\right)^2 = 0.65$$

wherein D=90 mm and $D_0$=72.5 mm.

The feedstock oil used was an aromatic hydrocarbon oil having a specific gravity (15/4° C.) of 1.0703, an Engler viscosity (40/20° C.) of 2.10, a benzene-insolubles content of 0.03%, a correlation index (BMCI) of 140 and an initial boiling point of 103° C. The fuel oil used was a hydrocarbon oil having a specific gravity (15/4° C.) of 0.903, a viscosity (at 50° C.) of 16.1 cSt, a residual carbon content of 5.4%, a sulfur content of 1.8% and a flash point of 96° C.

Three kinds of carbon black (Runs Nos. 1 to 3) according to the present invention were produced from the above-mentioned feedstock oil using the above-mentioned oil furnace and fuel oil under conditions as listed in the following Table 1.

TABLE I

| Run No. | Generator | Total air feed rate (Nm³/H) | Fuel oil feed rate (kg/H) | Fuel combustion rate (%) | Feedstock oil feed rate (kg/H) | Residence time (msec) |
|---|---|---|---|---|---|---|
| 1 | 1 | 200 | 11.6 | 160 | 46.4 | 5.2 |
|  | 1' | 300 | 17.3 | 160 | 57.9 |  |
| 2 | 1 | 250 | 15.4 | 150 | 41.6 | 4.0 |
|  | 1' | 350 | 21.6 | 150 | 46.2 |  |
| 3 | 1 | 200 | 12.3 | 150 | 41.2 | 5.0 |
|  | 1' | 330 | 20.3 | 150 | 54.9 |  |

Table II shows the data on the three kinds of carbon black thus produced with respect to nitrogen adsorption specific surface area ($N_2SA$). DBP absorption, intraaggregate void volume Vp, and value calculated according to the equation: [0.00976×DBP−0.0358].

The data on Runs Nos. 4 to 7 in Table II which are listed as comparative examples are those of hard grades of carbon black produced by conventional techniques, which have a nitrogen adsorption specific surface area ($N_2SA$) of at least 60 m²/g but an intraaggregate void volume Vp falling outside the range specified in the present invention.

TABLE II

| Properties | Ex. Run No. 1 | Ex. Run No. 2 | Ex. Run No. 3 | Comp. Ex. Run No. 4 (N330) | Comp. Ex. Run No. 5 (N220) | Comp. Ex. Run No. 6 (N110) | Comp. Ex. Run No. 7 |
|---|---|---|---|---|---|---|---|
| $N_2SA$ (m²/g) | 112 | 143 | 120 | 76 | 117 | 143 | 152 |
| DBP (ml/100 g) | 109 | 145 | 115 | 106 | 118 | 116 | 143 |
| Vp (ml/g) | 1.11 | 1.45 | 1.20 | 0.95 | 1.07 | 1.05 | 1.30 |
| value of equation | 1.03 | 1.38 | 1.09 | 1.00 | 1.12 | 1.10 | 1.36 |

EXAMPLE 2

Each of the three kinds of carbon black produced in Example 1 was blended with natural rubber and other components at a blending ratio as shown in Table III.

TABLE III

| Components | parts by weight |
|---|---|
| natural rubber (RSS #1) | 100 |
| carbon black | 50 |
| aromatic oil (softener) | 4 |
| stearic acid (dispersing vulcanization aid) | 3 |
| zinc oxide (vulcanization aid) | 5 |
| dibenzothiazyl disulfide (vulcanization accelerator) | 1 |
| sulfur (vulcanizing agent) | 2.5 |

The compound as shown in Table 3 was vulcanized at a temperature of 145° C. for 40 minutes to prepare a rubber composition, which was then examined with respect to various rubber characteristics. The results are shown in Table IV with the same Runs Nos. as those of carbon black in Table II.

TABLE IV

| Properties | Ex. Run No. 1 | Ex. Run No. 2 | Ex. Run No. 3 | Comp. Ex. Run No. 4 | Comp. Ex. Run No. 5 | Comp. Ex. Run No. 6 | Comp. Ex. Run No. 7 |
|---|---|---|---|---|---|---|---|
| Hardness (JIS Hs) | 64 | 66 | 65 | 63 | 63 | 65 | 66 |
| 300% Modulus (kg/cm$^2$) | 126 | 132 | 129 | 112 | 120 | 115 | 130 |
| Tensile strength (kg/cm$^2$) | 298 | 290 | 296 | 274 | 286 | 289 | 287 |
| Elongation (%) | 570 | 530 | 560 | 580 | 570 | 595 | 535 |
| Abration loss | | | | | | | |
| slip ratio 24% | 0.0702 | 0.0649 | 0.0660 | 0.0892 | 0.0747 | 0.0710 | 0.0684 |
| slip ratio 60% | 0.0957 | 0.0831 | 0.0874 | 0.1204 | 0.1011 | 0.0966 | 0.0880 |
| Hysteresis loss (tan δ) | 0.261 | 0.275 | 0.265 | 0.244 | 0.270 | 0.271 | 0.282 |

As is apparent from the results of Table IV, the rubber compositions of Examples according to the present invention were improved in abrasion resistance per hysteresis loss (tan δ) while securing substantially the same level of hysteresis loss (tan δ) as those of Comparative Examples wherein use was made of substantially the same grade of conventional carbon black. The hysteresis loss is an indicator of heat build-up.

What is claimed is:

1. Carbon black for a tire tread rubber which has a nitrogen adsorption specific surface area (N$_2$SA) of 60 to 160 m$^2$/g and a dibutyl phthalate absorption (DBP) of 90 to 150 ml/100 g and an intraaggregate void volume Vp (ml/g) at least equal to the value calculated according to the equation: $(0.00976 \times DBP - 0.0358)$.

* * * * *